United States Patent
Döttling et al.

(10) Patent No.: US 8,787,843 B2
(45) Date of Patent: Jul. 22, 2014

(54) WAKE UP PROCEDURE FOR A BASE STATION IN A COMMUNICATIONS NETWORK

(75) Inventors: Martin Döttling, Neubiberg (DE); Jürgen Michel, Munich (DE)

(73) Assignee: Nokia Siemens Networks Oy, Espoo (FI)

( * ) Notice: Subject to any disclaimer, the term of this patent is extended or adjusted under 35 U.S.C. 154(b) by 251 days.

(21) Appl. No.: 13/380,618

(22) PCT Filed: Jun. 26, 2009

(86) PCT No.: PCT/EP2009/058026
§ 371 (c)(1),
(2), (4) Date: Mar. 20, 2012

(87) PCT Pub. No.: WO2010/149216
PCT Pub. Date: Dec. 29, 2010

(65) Prior Publication Data
US 2012/0178383 A1 Jul. 12, 2012

(51) Int. Cl.
*H04W 88/02* (2009.01)
(52) U.S. Cl.
USPC .............................. 455/73; 370/276; 375/214
(58) Field of Classification Search
CPC . H04W 88/08; H04W 88/06; H04W 52/0235; H04W 72/1284
USPC .......................................................... 455/73
See application file for complete search history.

(56) References Cited

U.S. PATENT DOCUMENTS

| | | | | |
|---|---|---|---|---|
| 4,453,229 A | * | 6/1984 | Schaire | 710/109 |
| 5,003,538 A | * | 3/1991 | Lee et al. | 714/748 |
| 5,007,054 A | * | 4/1991 | Lee et al. | 714/748 |
| 5,091,904 A | * | 2/1992 | Back et al. | 370/220 |
| 5,416,831 A | * | 5/1995 | Chewning et al. | 379/93.25 |
| 5,465,392 A | * | 11/1995 | Baptist et al. | 370/310 |
| 5,590,396 A | * | 12/1996 | Henry | 455/426.1 |
| 5,692,197 A | * | 11/1997 | Narad et al. | 713/323 |

(Continued)

FOREIGN PATENT DOCUMENTS

| WO | WO 03/061176 A2 | 7/2003 |
|---|---|---|
| WO | WO 2004/075583 A1 | 9/2004 |

*Primary Examiner* — Hai V Nguyen
(74) *Attorney, Agent, or Firm* — Harrington & Smith (57) ABSTRACT

A mobile apparatus transmits a message for waking up an apparatus of a communications network in order to achieve access to the communications network. An apparatus of the communications network receives the message, determines whether the apparatus is in a standby mode in which the transmitter is deactivated, and shifts to a wake up mode, in which the transmitter is kept deactivated, for at most an apparatus-specific offset time in response to receipt of the message in case the apparatus is in the standby mode. The apparatus detects whether an acknowledgment message acknowledging that a successful access to the communications network has been achieved based on the message is received in the wake up mode of the apparatus, and the apparatus shifts to an active mode in which the transmitter is activated and provides access to the communications network for the mobile apparatus based on the message using the transmitter in case no acknowledgment message has been received in the wake up mode when the apparatus-specific offset time elapses. Otherwise, the apparatus shifts to the standby mode when the acknowledgement message is received in the wake up mode. The acknowledgment message may be received from the mobile apparatus or from an apparatus of the communications network.

26 Claims, 3 Drawing Sheets

(56) References Cited

U.S. PATENT DOCUMENTS

| | | | |
|---|---|---|---|
| 6,014,710 A * | 1/2000 | Talluri et al. | 709/237 |
| 6,038,455 A * | 3/2000 | Gardner et al. | 455/447 |
| 6,058,289 A * | 5/2000 | Gardner et al. | 340/7.32 |
| 6,163,696 A * | 12/2000 | Bi et al. | 455/436 |
| 6,192,230 B1 * | 2/2001 | van Bokhorst et al. | 455/343.3 |
| 6,278,864 B1 * | 8/2001 | Cummins et al. | 455/73 |
| 6,294,539 B1 * | 9/2001 | Lou et al. | 514/255.01 |
| 6,363,267 B1 * | 3/2002 | Lindskog et al. | 455/574 |
| 6,466,608 B1 * | 10/2002 | Hong et al. | 375/137 |
| 6,526,131 B1 * | 2/2003 | Zimmerman et al. | 379/106.09 |
| 6,529,748 B1 * | 3/2003 | Bruner | 455/574 |
| 6,556,580 B1 * | 4/2003 | Wang et al. | 370/412 |
| 6,567,397 B1 * | 5/2003 | Campana, Jr. et al. | 370/349 |
| 6,580,704 B1 * | 6/2003 | Wellig et al. | 370/338 |
| 6,615,383 B1 * | 9/2003 | Talluri et al. | 714/749 |
| 6,622,251 B1 * | 9/2003 | Lindskog et al. | 713/300 |
| 6,687,847 B1 * | 2/2004 | Aguilera et al. | 714/4.3 |
| 6,690,655 B1 * | 2/2004 | Miner et al. | 370/278 |
| 6,816,976 B2 * | 11/2004 | Wright et al. | 713/323 |
| 6,907,015 B1 * | 6/2005 | Moulsley et al. | 370/329 |
| 6,937,641 B2 * | 8/2005 | Li et al. | 375/141 |
| 7,023,356 B2 * | 4/2006 | Burkhardt et al. | 340/8.1 |
| 7,043,255 B1 * | 5/2006 | Tiwari | 455/456.1 |
| 7,107,318 B2 * | 9/2006 | Brown et al. | 709/208 |
| 7,116,651 B2 * | 10/2006 | Hakkinen et al. | 370/329 |
| 7,116,670 B2 * | 10/2006 | Tai et al. | 370/395.2 |
| 7,130,668 B2 * | 10/2006 | Chang et al. | 455/574 |
| 7,164,654 B2 * | 1/2007 | Hunzinger et al. | 370/230 |
| 7,203,596 B2 * | 4/2007 | Ledingham et al. | 701/120 |
| 7,231,223 B2 * | 6/2007 | May et al. | 455/519 |
| 7,263,558 B2 * | 8/2007 | Ledingham et al. | 1/1 |
| 7,426,190 B2 * | 9/2008 | Manjeshwar et al. | 370/254 |
| 7,428,225 B2 * | 9/2008 | Uchida | 370/329 |
| 7,460,838 B2 * | 12/2008 | Hasegawa | 455/90.2 |
| 7,548,758 B2 * | 6/2009 | Periyalwar et al. | 455/517 |
| 7,567,791 B2 * | 7/2009 | Laroia et al. | 455/343.2 |
| 7,573,841 B2 * | 8/2009 | Lee et al. | 370/311 |
| 7,606,173 B2 * | 10/2009 | Lal | 370/254 |
| 7,636,042 B2 * | 12/2009 | Hameed | 340/539.3 |
| 7,697,464 B2 * | 4/2010 | Wakamatsu | 370/311 |
| 7,718,602 B2 * | 5/2010 | Bringe | 514/21.2 |
| 7,729,285 B2 * | 6/2010 | Yoon | 370/254 |
| 7,752,473 B1 * | 7/2010 | Kwa et al. | 713/323 |
| 7,783,908 B2 * | 8/2010 | Bogovac | 713/323 |
| 7,801,072 B2 * | 9/2010 | Son et al. | 370/329 |
| 7,831,283 B2 * | 11/2010 | Ogushi et al. | 455/574 |
| 7,848,281 B2 * | 12/2010 | Bienas et al. | 370/329 |
| 7,853,278 B2 * | 12/2010 | Hayashi et al. | 455/518 |
| 7,877,617 B2 * | 1/2011 | Kaneda | 713/300 |
| 7,885,212 B2 * | 2/2011 | Gerstenberger et al. | 370/329 |
| 7,912,467 B2 * | 3/2011 | Yoon et al. | 455/435.1 |
| 7,945,296 B2 * | 5/2011 | Hubert et al. | 455/574 |
| 7,990,927 B2 * | 8/2011 | Choi et al. | 370/335 |
| 7,995,508 B2 * | 8/2011 | Ruy et al. | 370/311 |
| 8,000,305 B2 * | 8/2011 | Tan et al. | 370/335 |
| 8,027,282 B2 * | 9/2011 | Boehnke et al. | 370/311 |
| 8,040,151 B2 * | 10/2011 | Speers | 326/38 |
| 8,041,972 B2 * | 10/2011 | Jarosinski et al. | 713/323 |
| 8,055,886 B2 * | 11/2011 | Tashiro et al. | 712/241 |
| 8,078,132 B2 * | 12/2011 | Wang | 455/306 |
| 8,078,672 B2 * | 12/2011 | Deiretsbacher et al. | 709/203 |
| 8,082,458 B2 * | 12/2011 | Kay | 713/320 |
| 8,102,999 B2 * | 1/2012 | Corndorf | 380/37 |
| 8,199,002 B2 * | 6/2012 | Suzuki et al. | 340/539.17 |
| 8,218,488 B2 * | 7/2012 | Wager et al. | 370/329 |
| 8,295,196 B2 * | 10/2012 | Ergen et al. | 370/252 |
| 8,310,919 B2 * | 11/2012 | Worrall | 370/229 |
| 8,320,965 B2 * | 11/2012 | Kwun et al. | 455/561 |
| 8,321,653 B2 * | 11/2012 | McNutt et al. | 713/1 |
| 8,331,995 B2 * | 12/2012 | Hevizi et al. | 455/574 |
| 8,538,421 B2 * | 9/2013 | Brisebois et al. | 455/432.3 |
| 8,559,362 B2 * | 10/2013 | Vujcic et al. | 370/319 |
| 8,625,574 B2 * | 1/2014 | Twitchell et al. | 370/351 |
| 2002/0044642 A1 * | 4/2002 | Danner et al. | 379/355.01 |
| 2002/0172192 A1 * | 11/2002 | Hunzinger et al. | 370/352 |
| 2003/0026324 A1 * | 2/2003 | Li et al. | 375/141 |
| 2003/0161348 A1 * | 8/2003 | Mills et al. | 370/509 |
| 2004/0068666 A1 * | 4/2004 | Tosey | 713/201 |
| 2004/0081133 A1 * | 4/2004 | Smavatkul et al. | 370/346 |
| 2004/0151147 A1 * | 8/2004 | Huckins | 370/338 |
| 2004/0202147 A1 * | 10/2004 | Hakkinen et al. | 370/351 |
| 2004/0219931 A1 * | 11/2004 | Bi et al. | 455/456.1 |
| 2005/0059437 A1 | 3/2005 | Son et al. | 455/574 |
| 2005/0190738 A1 * | 9/2005 | Smavatkul et al. | 370/346 |
| 2005/0254467 A1 * | 11/2005 | Li et al. | 370/335 |
| 2006/0171341 A1 * | 8/2006 | Wang et al. | 370/311 |
| 2006/0215588 A1 * | 9/2006 | Yoon | 370/310 |
| 2006/0247736 A1 * | 11/2006 | Roberts | 607/60 |
| 2007/0013549 A1 * | 1/2007 | Schleich et al. | 340/870.02 |
| 2007/0066273 A1 * | 3/2007 | Laroia et al. | 455/343.2 |
| 2007/0076650 A1 * | 4/2007 | Manjeshwar et al. | 370/328 |
| 2007/0140115 A1 * | 6/2007 | Bienas et al. | 370/230 |
| 2007/0165567 A1 * | 7/2007 | Tan et al. | 370/329 |
| 2007/0273484 A1 * | 11/2007 | Cederlof et al. | 340/10.33 |
| 2007/0281617 A1 * | 12/2007 | Meylan et al. | 455/41.2 |
| 2007/0298824 A1 * | 12/2007 | Ostman et al. | 455/522 |
| 2008/0043658 A1 * | 2/2008 | Worrall | 370/312 |
| 2008/0068238 A1 * | 3/2008 | Bell et al. | 341/139 |
| 2008/0068239 A1 * | 3/2008 | Anderson et al. | 341/139 |
| 2008/0091931 A1 * | 4/2008 | McNutt et al. | 713/1 |
| 2008/0158177 A1 * | 7/2008 | Wilson et al. | 345/173 |
| 2008/0162835 A1 * | 7/2008 | Wilson et al. | 711/155 |
| 2008/0165717 A1 * | 7/2008 | Chen et al. | 370/312 |
| 2008/0194259 A1 * | 8/2008 | Vujcic et al. | 455/435.1 |
| 2008/0212506 A1 * | 9/2008 | Lee et al. | 370/310 |
| 2008/0233964 A1 * | 9/2008 | McCoy et al. | 455/450 |
| 2008/0279257 A1 * | 11/2008 | Vujcic et al. | 375/132 |
| 2009/0177941 A1 * | 7/2009 | Wager | 714/752 |
| 2009/0196195 A1 * | 8/2009 | Gerstenberger et al. | 370/252 |
| 2009/0203325 A1 * | 8/2009 | Wang | 455/69 |
| 2009/0213771 A1 * | 8/2009 | Celentano et al. | 370/310 |
| 2009/0276674 A1 * | 11/2009 | Wei et al. | 714/749 |
| 2010/0027449 A1 * | 2/2010 | Kim et al. | 370/311 |
| 2010/0046384 A1 * | 2/2010 | Lee et al. | 370/252 |
| 2010/0079278 A1 * | 4/2010 | Suzuki et al. | 340/539.17 |
| 2010/0080135 A1 * | 4/2010 | Ishii et al. | 370/252 |
| 2010/0099405 A1 * | 4/2010 | Brisebois et al. | 455/434 |
| 2010/0121414 A1 * | 5/2010 | Roberts | 607/60 |
| 2010/0182901 A1 * | 7/2010 | Yoon | 370/217 |
| 2010/0210243 A1 * | 8/2010 | Vujcic | 455/411 |
| 2010/0316158 A1 * | 12/2010 | Arne | 375/285 |
| 2011/0076964 A1 * | 3/2011 | Dottling et al. | 455/68 |
| 2011/0128865 A1 * | 6/2011 | Doppler et al. | 370/252 |
| 2011/0128869 A1 * | 6/2011 | Coleri Ergen et al. | 370/252 |
| 2011/0134836 A1 * | 6/2011 | Lin et al. | 370/328 |
| 2011/0182213 A1 * | 7/2011 | Forssell et al. | 370/277 |
| 2011/0183663 A1 * | 7/2011 | Kenehan et al. | 455/423 |
| 2011/0211513 A1 * | 9/2011 | Coleri Eregen et al. | 370/311 |
| 2012/0002643 A1 * | 1/2012 | Chung et al. | 370/331 |
| 2012/0020322 A1 * | 1/2012 | Fan et al. | 370/330 |
| 2012/0224568 A1 * | 9/2012 | Freda et al. | 370/338 |
| 2012/0264442 A1 * | 10/2012 | Gerstenberger et al. | 455/450 |
| 2012/0270543 A1 * | 10/2012 | Moulsley et al. | 455/434 |
| 2012/0294209 A1 * | 11/2012 | Periyalwar et al. | 370/280 |
| 2013/0090705 A1 * | 4/2013 | Bange et al. | 607/60 |
| 2013/0242786 A1 * | 9/2013 | Gerstenberger et al. | 370/252 |
| 2013/0344861 A1 * | 12/2013 | Brisebois et al. | 455/418 |

\* cited by examiner

Fig. 1

WAKE UP PROCEDURE FOR A BASE STATION IN A COMMUNICATIONS NETWORK

The present invention relates to mobile wireless communications systems, and in particular to a wake up procedure for a base station in a communications network.

The mobile wireless communications systems may comprise 3GPP (3$^{rd}$ Generation Partnership Project) Long-Term Evolution (LTE & LTE-A) systems.

More specifically, the present invention relates to self-optimization functionality in wireless communications systems to allow energy savings which is a major concern in wireless systems.

In particular, the present invention relates to wireless communications systems comprising a standby and wake up procedure for a base station such as an NB (Node B) or H(e)NB (Home enhanced Node B) available in case all subscribed users leave or a subscribed user enters a coverage area of the base station. The standby and wake up procedure allows to switch off a transmitter of the base station during times of absence which results in a standby mode of the base station, thus reducing power consumption and electromagnetic radiation from the base station during service inactivity by an efficient standby mode.

In this standby mode, a receiver chain of the base station remains activated and the base station can be waked up by a mobile station by means of a RACH (Random Access Channel) using a specific RACH preamble sequence. This means in the communications system one or multiple RACH preamble sequence(s) is/are reserved and used to wake up base stations from standby mode.

In case of transmission of a wake up RACH sequence not only a single base station may wake up but multiple base stations may shift from standby mode to active mode at the same time. This, however, induces many changes in cell border and handover regions to the communications system and triggers handover of multiple mobile stations to those new activated cells and causes instantaneous high peak load for signaling.

The present invention aims at solving this problem and provides a mobile apparatus, an apparatus of a communications network and methods and a computer program product as set out in the appended claims.

According to an embodiment of the invention, a mobile apparatus transmits a message for waking up an apparatus of a communications network in order to achieve access to the communications network. An apparatus of the communications network receives the message, determines whether the apparatus is in a standby mode in which the transmitter is deactivated, and shifts to a wake up mode, in which the transmitter is kept deactivated, for at most an apparatus-specific offset time in response to receipt of the message in case the apparatus is in the standby mode. The apparatus detects whether an acknowledgment message acknowledging that a successful access to the communications network has been achieved based on the message is received in the wake up mode of the apparatus, and the apparatus shifts to an active mode in which the transmitter is activated and provides access to the communications network for the mobile apparatus based on the message using the transmitter in case no acknowledgment message has been received in the wake up mode when the apparatus-specific offset time elapses. Otherwise, the apparatus shifts to the standby mode when the acknowledgement message is received in the wake up mode.

The acknowledgment message may be received from the mobile apparatus or from an apparatus of the communications network.

According to an embodiment of the invention, a case is addressed where multiple base stations of a communications network, such as NBs or HeNBs, are in a standby mode in which a transmitter of a base station is switched off but a receiver of the base station is still active, and a single or multiple mobile station(s) is/are requesting access to the communications network by using a specific wake up RACH preamble sequence.

In this case an unnecessary reactivation of base stations should be prevented. According to an embodiment of the invention, a selective and sequential reactivation is achieved by a time shifted wake up procedure and a second RACH preamble sequence transmitted from a mobile station. According to another embodiment of the invention, a selective and sequential reactivation is achieved by a time shifted wake up procedure and signaling via the communications network after handshake with one re-activated base station.

In the following embodiments of the invention are described by referring to the accompanying drawings, in which.

Figure 1:
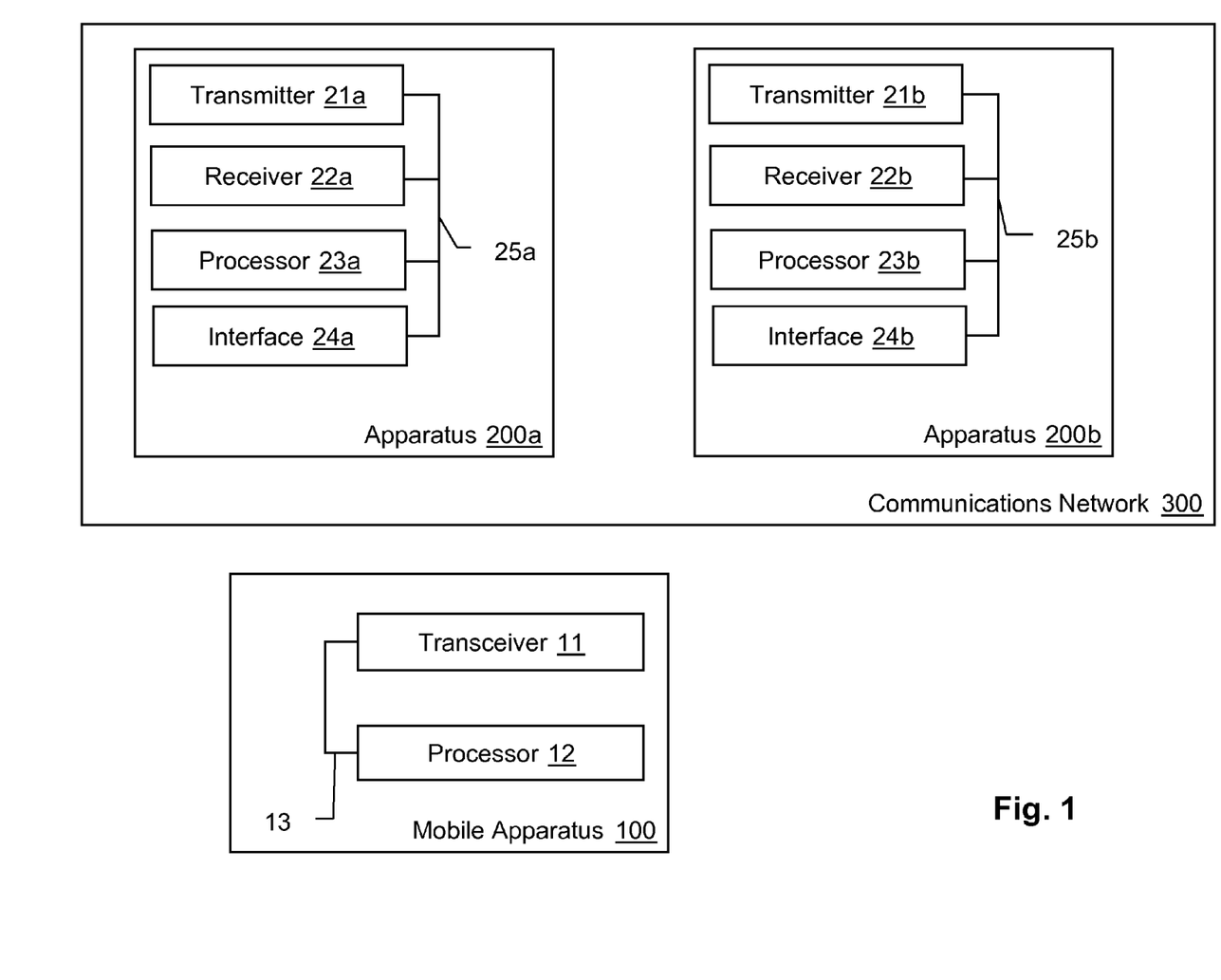
FIG. 1 shows a schematic block diagram illustrating configuration of a mobile apparatus and communications network apparatuses according to an embodiment of the invention.

As shown in FIG. 1, a mobile apparatus 100 such as a mobile station or user equipment comprises a transceiver 11 and a processor 12 which are connected by a bus 13.

An apparatus 200a of a communications network 300 comprises a transmitter 21a, a receiver 22a, a processor 23a and an interface 24a which are connected by a bus 25a. Similarly, an apparatus 200b of the communications network 300 comprises a transmitter 21b, a receiver 22b, a processor 23b and an interface 24b which are connected by a bus 25b. The apparatuses 200a, 200b may comprise base stations such as NBs or HeNBs. The communications network 300 may be a network according to LTE technology but is not limited thereto.

The communications network 300 may comprise a plurality of apparatuses 200a, 200b.

In a case where multiple apparatuses 200a, 200b are in a standby mode in which a transmitter or transmitter chain of an apparatus 200a, 200b is switched off but a receiver of the apparatus 200a, 200b is still active, the mobile apparatus 100 requests access to the communications network 300 by using a wake up message. The processor 12 of the mobile apparatus 100 may cause the transceiver 11 to transmit the wake up message for waking up an apparatus 200a, 200b of the communications network 300 in order to achieve access to the communications network 300.

Figure 2:
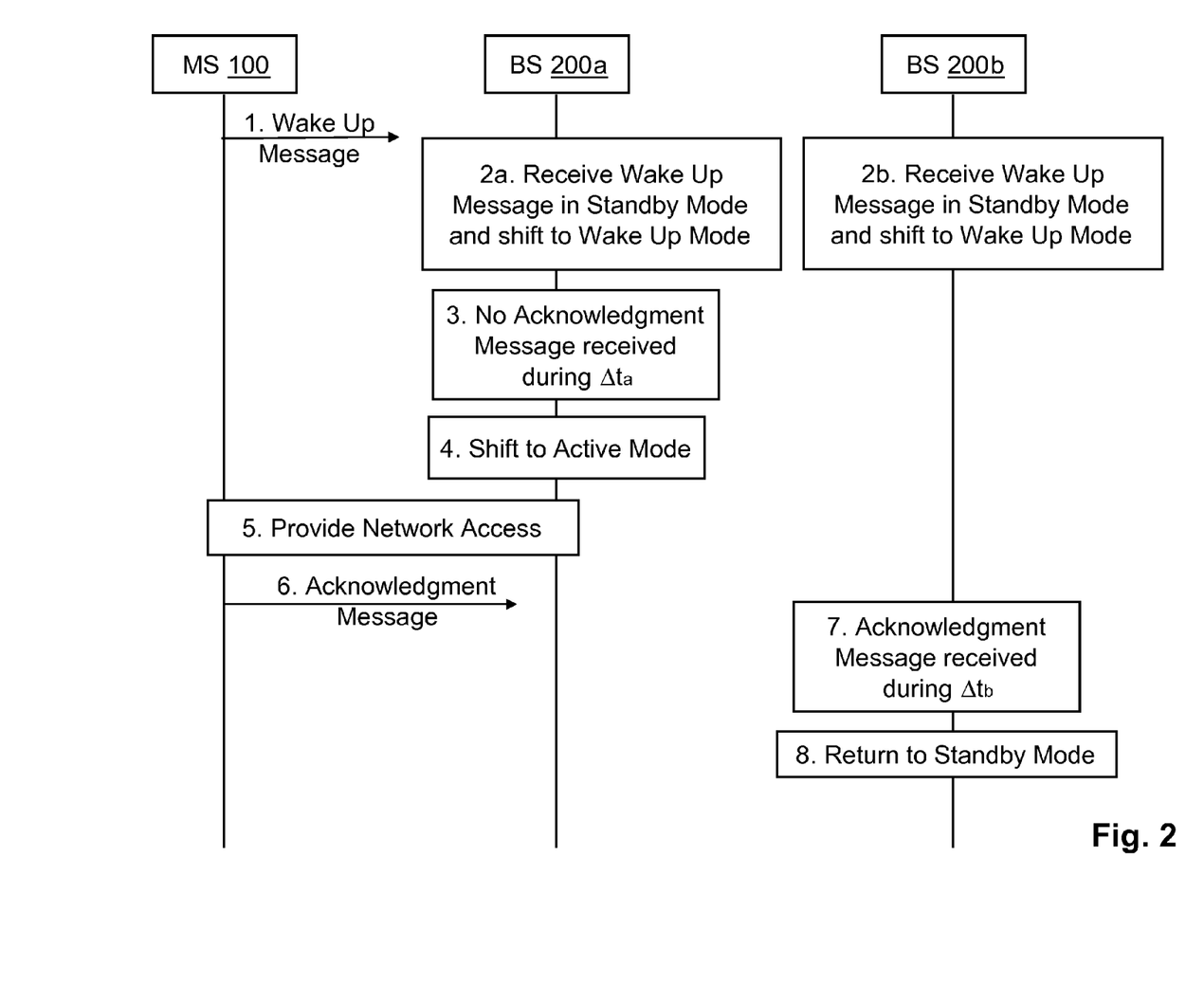
FIG. 2 shows a signaling diagram illustrating wake up signaling between a mobile apparatus and communications network apparatuses according to an embodiment of the invention.

Referring to FIG. 2, in communication 1 the mobile apparatus MS 100 sends the wake up message which may comprise a RACH wake up preamble sequence which is reserved for a wake up procedure of apparatuses 200a, 200b of the communications network 300.

The power setting or power ramping procedure may be more aggressive since DL (Downlink) open loop path loss estimation may not be possible. In other words, the processor 12 may cause the transceiver 11 to transmit the wake up message using a sharp power setting.

The receiver 22a, 22b of the apparatus 200a, 200b receives the wake up message and the processor 23a, 23b determines whether the apparatus 200a, 200b is in the standby mode in which the transmitter 21, 21b is deactivated, and shifts the apparatus 200a, 200b to a wake up mode, in which the transmitter 21a, 21b is kept deactivated, for at most an apparatus-specific offset time $\Delta t_{a,b}$ in response to receipt of the wake up message in case the apparatus 200a, 200b is in the standby mode.

Referring to FIG. 2, upon receiving the wake up message the apparatus BS 200a and the apparatus BS 200b determine that they are in the standby mode and shift to the wake up mode in processes 2a, 2b.

Each apparatus 200a, 200b that receives this wake up message may be shifted into an active mode after a specific offset time $\Delta t_{a,b}$:

The offset time $\Delta t_{a,b}$ for apparatuses 200a, 200b with deactivated transmitter 21a, 21b is apparatus-specific which ensures that a successful access attempt with another apparatus 200a, 200b can be detected prior to activation of an own transmitter chain. Moreover, the offset time $\Delta t_{a,b}$ is greater than a minimum offset time $t_{min}$, which ensures that a re-activation of an apparatus 200a, 200b is only triggered if no active apparatus of the communications network 300 can serve the mobile apparatus 100. A maximum offset time $t_{max}$ is also given for implementation reasons.

$t_{min}$ and $t_{max}$ may be configurable by the communications network 300 and signaled via S1 interface to all apparatuses 200a, 200b. For example, the interface 24a, 24b may receive the minimum offset time and the maximum offset time from the communications network 300.

Each apparatus 200a, 200b with deactivated transmitter chain may derive the apparatus-specific offset time $\Delta t$ based on locally unique information, e.g. its (physical) cell ID. For example, the apparatus-specific offset time $\Delta t$ may be derived from the cell ID using a modulo function e.g. offset time $\Delta t$=cell ID mod x or some other function f e.g. offset time $\Delta t$=f(cell ID). For example, the processor 23a, 23b may derive the apparatus-specific offset time $\Delta t$ using the above functions.

Another option is that the offset time $\Delta t$ is determined, e.g. by the processor 23, 23b, based on a time of deactivation of the transmitter chain, i.e. ensuring that the longer the apparatus 200a, 200b has already been deactivated, the smaller $\Delta t$. In doing so, the apparatus with the transmitter chain deactivated for the longest time out of the apparatuses with deactivated transmitter chains will be the next apparatus to be shifted into the active mode. This allows to improve the probability for longer times of deactivation of a deactivated transmitter chain and minimizes the number of re-activation cycles, which is important due to related overhead and impact on equipment lifetime.

The processor 23a, 23b detects whether an acknowledgment message acknowledging a successful access to the communications network 300 based on the wake up message is received in the wake up mode of the apparatus 200a, 200b, and shifts the apparatus 200a, 200b to the active mode in which the transmitter 21a, 21b is activated and provides access to the communications network 300 for the mobile apparatus 100 based on the wake up message using the transmitter 21a, 21b in case no acknowledgment message has been received in the wake up mode when the apparatus-specific offset time $\Delta t_{a,b}$ elapses.

Otherwise, the processor 23a, 23b shifts the apparatus 200a, 200b to the standby mode when the acknowledgement message is received in the wake up mode of the apparatus 200a, 200b.

Referring to FIG. 2, in process 3 the apparatus BS 200a determines that during its apparatus-specific offset time $\Delta t_a$ no acknowledgment message has been received. Therefore, the apparatus BS 200a shifts to the active mode in process 4.

In process 5 the apparatus BS 200a provides communications network access for the mobile apparatus MS 100.

It is to be noted that if the apparatus BS 200a is in the active mode when receiving the wake up message it will not shift to the wake up mode but directly proceed to process 5.

According to an embodiment of the invention, the processor 12 of the mobile apparatus 100 determines successful access to the communications network 300 based on the wake up message, and causes the transceiver 11 to transmit an acknowledgment message for acknowledging the successful access. Referring to FIG. 2, this acknowledgement message is sent in communication 6.

According to an implementation example of the invention, the wake up message includes a RACH wake up preamble sequence (first preamble sequence), and the acknowledgment message includes a second RACH preamble sequence (second preamble sequence). After a successful RACH attempt with apparatus 200a the mobile apparatus 100 sends in communication 6 of FIG. 2 the second RACH preamble sequence to prevent more apparatuses of the communications network 300 from waking up and indicates therewith that the wake up message is acknowledged.

The successful RACH attempt with apparatus 200a includes sending of a wake up message including the RACH wake up preamble sequence (communication 1), wake up of apparatus 200a (process 4), detection of new cell by the mobile apparatus 100 (process 5), reading synchronization sequences by the mobile apparatus 100 (process 5), detecting BCCH (Broadcast Control Channel) and information on RACH slots and allowed preambles (process 5) and having performed a successful RACH procedure in process 5.

With the second RACH preamble sequence it is indicated by the mobile apparatus MS 100 that the apparatus BS 200a is awake to serve the MS 100 and that other apparatuses such as the apparatus 200b of the communications network 300 do not have to wake up. Therefore, the communications network apparatuses which are in wake up procedure due to having received a RACH wake up preamble sequence can stop the wake up procedure and continue with the standby mode.

To ensure that only communications network apparatuses that received a RACH wake up preamble sequence 1 from a mobile apparatus 1 stop the wake up procedure again the second RACH preamble sequence (indicating that now for mobile apparatus 1 there is already an awake network communications apparatus available) may be linked to RACH wake up preamble sequence 1. Then the second RACH preamble sequence indicating "wake up is acknowledged" may use sequence 1+n where n is preconfigured.

For example, a set of available LTE RACH preamble sequences is divided according to the table below:

| Meaning | Sequence Number |
| --- | --- |
| Conventional RACH | n0 . . . n1 |
| RACH wake up | n1 + 1 . . . n2 |
| RACH wake up acknowledged | n2 + 1 . . . n3 |

If a mobile apparatus uses sequence n1+1+x for the RACH wake up preamble sequence it may use sequence n2+1+x for the second RACH preamble sequence indicating "wake up acknowledged".

In other words, the acknowledgement message may be linked to the wake up message such that the wake up message can be identified based on the acknowledgment message. According to the above implementation example in which the wake up message includes a first preamble sequence out of a plurality of first preamble sequences and the acknowledgment message includes a second preamble sequence out of a plurality of second preamble sequences, the second preamble sequence is linked to the first preamble sequence such that the first preamble sequence can be identified based on the second preamble sequence.

The set of available LTE RACH preamble sequences may comprise existing sequences and/or additional ones, in particular additional sequences may be defined for RACH wake up preamble sequences and second RACH preamble sequences indicating "wake up acknowledged".

The mobile apparatus 100 may select randomly for a RACH wake up preamble sequence the sequence to use out of the set of available sequences. According to the above table the available sequences are n1+1 . . . n2.

Referring again to FIG. 2, in process 7 the apparatus BS 200b receives the acknowledgment message during its apparatus-specific offset time $\Delta t_b$ and returns to the standby mode in process 8.

In process 7 the processor 23b may determine that the acknowledgment message acknowledges the successful access to the communications network 300 based on the wake up message received in process 2b, using preamble sequences of the wake up message and the acknowledgment message.

With the wake up procedure illustrated in FIG. 2, all communications network apparatuses such as the apparatus BS 200b that are in the wake up procedure but did not respond to the above-described RACH procedure are going again to the standby mode. Being in the wake up procedure means that these apparatuses are shifted to the wake up mode by the wake up RACH preamble sequence but have their downlink transmitter not active since they are still in a waiting state due to the offset time Δt. Only the apparatus BS 200a which responded after receiving the wake up message to the RACH procedure has shifted to and remains in the active mode.

Figure 3:
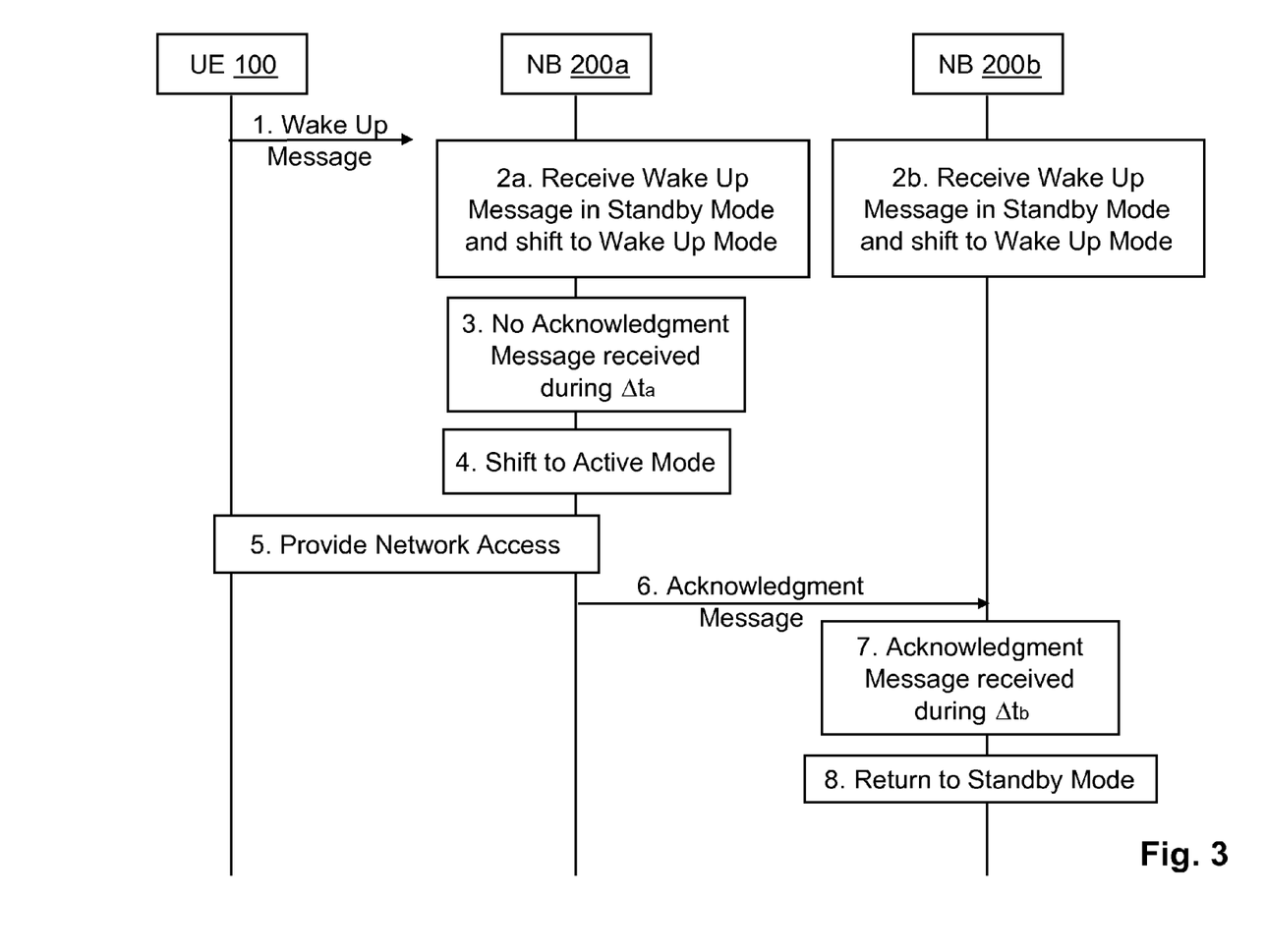
FIG. 3 shows a signaling diagram illustrating wake up signaling between a mobile apparatus and communications network apparatuses according to another embodiment of the invention.

FIG. 3 illustrates another embodiment of the wake up procedure. Communication 1 and processes 2a, 2b, 3 to 5, 7 and 8 correspond to those shown in FIG. 2 and repetition of the description thereof is omitted.

As shown in FIG. 3, in case the apparatus BS 200a has provided access to the communications network 300 for the mobile apparatus MS 100 based on the wake up message, in communication 6 an acknowledgment message is sent to apparatuses of the communications network such as the apparatus BS 200b. The acknowledgement message acknowledges that successful access to the communications network 300 has been achieved based on the wake up message. The processor 23a may cause the interface 24a to send the acknowledgement message.

In turn, the interface 24b of the apparatus BS 200b may receive the acknowledgement message.

The acknowledgment message may include an identity of the mobile apparatus MS 100 and/or a timestamp and a cell identity of a location from where the wake up message is transmitted and/or a preamble sequence included in the wake up message and a cell identity of the apparatus BS 200a transmitting the acknowledgment message.

According to an implementation example of the wake up procedure shown in FIG. 3, after successful RACH procedure with the mobile apparatus MS 100, the apparatus BS 200a signals over the communications network 300, i.e. either S1 or X2 interface, a message indicating which mobile apparatus wake up requests are already handled, utilizing the mobile apparatus ID and/or a timestamp and a cell ID (i.e. location/area where RACH wake up preamble sequence was transmitted) and/or the used RACH wake up preamble sequence and the own cell ID (i.e. location of the apparatus BS 200a).

With the network signaling in communication 6 of FIG. 3 it is indicated that a communications network apparatus is awake to serve the mobile apparatus MS 100 and that other communications network apparatuses do not have to wake up.

The wake up procedure illustrated in FIG. 2 may allow faster operation at the expense of some additional radio resource consumption and mobile apparatus impact, whereas the wake up procedure illustrated in FIG. 3 prevents this impact but may include longer delays. Therefore $t_{min}$ and Δt need to be set accordingly. Moreover, based on existing neighbor relations, it may not be ensured that the acknowledgement message is sent to all communications network apparatuses that would potentially require it.

According to an embodiment of the invention, the number of reactivated apparatuses 200a, 200b can be minimized, thereby reducing energy consumption and interference. The deactivation time for each individual transmitter chain of one apparatus 200a, 200b can be maximized, thereby improving energy savings and lifetime of the equipment.

Moreover, it can be ensured that only a minimum number of apparatuses 200a, 200b wakes up at the same time forcing other mobile apparatuses to handover due to changing handover situation and cell boarders, and signaling peak load due to shift of handover regions with waking up apparatuses 200a, 200b can be minimized.

The above described wake up procedures may be applicable to both FDD and TDD systems and may be applied to base stations such as NBs or H(e)NBs that support the standby mode.

According to an aspect of the invention, a mobile apparatus such as e.g. the mobile apparatus 100 shown in FIG. 1 comprises transmitting and receiving means comprising e.g. the transceiver 11, and processing means comprising e.g. the processor 12. The processing means cause the transmitting and receiving means to transmit a message for waking up an apparatus of a communications network such as e.g. the apparatus 200a, 200b of the communications network 300, in order to achieve access to the communications network. Transmitting the message may be performed by communication 1 of FIG. 2 or FIG. 3. The processing means determine successful access to the communications network based on the message. Determining successful access may be performed in process 5 of FIG. 2 or FIG. 3. According to an embodiment of the invention, the processing means may cause the transmitting and receiving means to transmit an acknowledgment message for acknowledging the successful access. Transmitting the acknowledgment message may be performed by communication 6 in FIG. 2.

The acknowledgement message may be linked to the message such that the message can be identified based on the acknowledgment message. The message may include a first preamble sequence out of a plurality of first preamble sequences, the acknowledgment message may include a second preamble sequence out of a plurality of second preamble sequences, and the second preamble sequence may be linked to the first preamble sequence such that the first preamble sequence can be identified based on the second preamble sequence.

The processing means may cause the transmitting and receiving means to transmit the message using a sharp power setting.

An apparatus of a communications network such as e.g. the apparatus 200a, 200b shown in FIG. 1 comprises transmitting means comprising e.g. the transmitter 21a, 21b, and receiving means comprising e.g. the receiver 22a, 22b for receiving, from a mobile apparatus such as e.g. the mobile apparatus 100, a message for waking up the apparatus in order to achieve access to the communications network. Receiving the message may be performed in process 2a, 2b of FIG. 2 or FIG. 3. The apparatus further comprises processing means comprising e.g. the processor 23a, 23b for determining whether the apparatus is in a standby mode in which the transmitting means is deactivated, and shifting the apparatus to a wake up mode, in which the transmitting means is kept deactivated, for at most an apparatus-specific offset time in response to receipt of the message in case the apparatus is in the standby mode. Determining the standby mode and shifting to the wake up mode may be performed in process 2a, 2b of FIG. 2 or FIG. 3. The processing means detect whether an acknowledgment message acknowledging that a successful access to the communications network has been achieved based on the message is received in the wake up mode of the apparatus, and shift the apparatus to an active mode in which the transmitting means is activated and provide access to the communications network for the mobile apparatus based on the message using the transmitting means in case no acknowledgment message has been received in the wake up mode when the apparatus-specific offset time elapses. Detecting non-receipt of an acknowledgement message in the wake up mode when the apparatus-specific offset time elapses may be performed in process 3 of FIG. 2 or FIG. 3. Shifting to active mode may be performed in process 4 of FIG. 2 or FIG. 3, and provisioning access to the communications network may be performed in process 5 of FIG. 2 or FIG. 3. The processing means shift the apparatus to the standby mode when the acknowledgement message is received in the wake up mode of the apparatus. Detecting receipt of the acknowledgement message may be performed in process 7 of FIG. 2 or FIG. 3, and shifting to the standby mode may be performed in process 8 of FIG. 2 or FIG. 3.

The receiving means may receive the acknowledgement message from the mobile apparatus. Receiving the acknowledgement message from the mobile apparatus may be performed in process 7 of FIG. 2.

The processing means may determine that the acknowledgment message acknowledges the successful access to the communications network based on the message, using preamble sequences of the message and the acknowledgment message.

The apparatus may comprise interfacing means such as e.g. the interface 24a, 25a for receiving the acknowledgement message from an apparatus of the communications network. Receiving the acknowledgment message from an apparatus of the communications network may be performed in process 7 of FIG. 3.

The processing means may cause the interfacing means to send the acknowledgment message acknowledging that the successful access to the communications network has been achieved based on the message to apparatuses of the communications network in case the apparatus has provided access to the communications network for the mobile apparatus based on the message. Transmitting the acknowledgment message may be performed by communication 6 of FIG. 3.

In case the processing means determine that the apparatus is in the active mode when the message is received, the processing means may provide access to the communications network for the mobile apparatus based on the message and cause the interfacing means to send the acknowledgment message acknowledging that the successful access to the communications network has been achieved based on the message to apparatuses of the communications network in case the apparatus has provided access to the communications network for the mobile apparatus based on the message.

The acknowledgment message may include an identity of the mobile apparatus and/or a timestamp and a cell identity of a location from where the message is transmitted and/or a preamble sequence included in the message and a cell identity of the apparatus transmitting the acknowledgment message.

The apparatus-specific offset time may fulfill the following expression:

$$t_{min} < \Delta t < t_{max}$$

where $\Delta t$ is the apparatus-specific offset time, $t_{min}$ is a minimum offset time and $t_{max}$ is a maximum offset time, wherein the interfacing means may receive the minimum offset time and the maximum offset time from the communications network.

The processing means may derive the apparatus-specific offset time from a cell identity of the apparatus, and/or may determine the apparatus-specific offset time based on a time of deactivation of the transmitting means.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. An apparatus comprising:
   at least one processor;
   memory storing a program of instructions;
   wherein the memory storing the program of instructions is configured to, with the at least one processor, cause the apparatus to at least;
   cause a transmitter of a mobile communication device to transmit an access request message for waking up an apparatus of a communications network in order to achieve access to the communications network, determine successful access to the communications network based on the message, and
   cause the transmitter to transmit an acknowledgment message for acknowledging the successful access, wherein the acknowledgement message is linked to the access request message such that the access request message can be identified based on the acknowledgement message.

2. The mobile apparatus of claim 1, wherein the processor is configured to cause the transmitter to transmit the access request message using a power setting resulting from a relatively aggressive power setting procedure.

3. An apparatus of a communications network, the apparatus comprising:
   a transmitter;
   a receiver configured to receive, from a mobile apparatus, a message for waking up the apparatus in order to achieve access to the communications network; and
   a processor configured to
determine whether the apparatus is in a standby mode in which the transmitter is deactivated, shift the apparatus to a wake up mode, in which the transmitter is kept deactivated, for at most an apparatus-specific offset time in response to receipt of the message in case the apparatus is in the standby mode,
   detect whether an acknowledgment message acknowledging that a successful access to the communications network has been achieved based on the message is received in the wake up mode of the apparatus,
   shift the apparatus to an active mode in which the transmitter is activated and provide access to the communications network for the mobile apparatus based on the message using the transmitter in, case no acknowledgment message has been received in the wake up mode when the apparatus-specific offset time elapses, and shift the apparatus to the standby mode when the acknowledgement message is received in the wake up mode of the apparatus.

4. The apparatus of claim 3, wherein the receiver is configured to receive the acknowledgement message from the mobile apparatus.

5. The apparatus of claim 3 wherein the processor is configured to determine that the acknowledgment message acknowledges the successful access to the communications network based on the message, using preamble sequences of the message and the acknowledgment message.

6. The apparatus of claim 3, comprising an interface configured to receive the acknowledgement message from an apparatus of the communications network.

7. The apparatus of claim 3, comprising an interface, wherein the processor is configured to cause the interface to send the acknowledgment message acknowledging that the successful access to the communications network has been achieved based on the message to apparatuses of the communications network in case the apparatus has provided access to the communications network for the mobile apparatus based on the message.

8. The apparatus of claim 3, wherein the apparatus-specific offset time fulfills the following expression:

$$t_{min} < \Delta t < t_{max}$$

where $\Delta t$ is the apparatus-specific offset time, $t_{min}$ is a minimum offset time and $t_{max}$ is a maximum offset time, wherein the apparatus comprises an interface configured to receive the minimum offset time and the maximum offset time from the communications network.

9. The apparatus of claim 3, wherein the processor is configured to derive the apparatus-specific offset time from a cell identity of the apparatus and/or determine the apparatus-specific offset time based on a time of deactivation of the transmitter.

10. The apparatus of claim 3, comprising an interface, wherein when the processor determines that the apparatus is in the active mode when the message is received, the processor is configured to provide access to the communications network for the mobile apparatus based on the message and cause the interface to send the acknowledgment message acknowledging that the successful access to the communications network has been achieved based on the message to apparatuses of the communications network in case the apparatus has provided access to the communications network for the mobile apparatus based on the message.

11. A method comprising:
   transmitting an access request message for waking up an apparatus of a communications network in order to achieve access to the communications network;
   determining successful access to the communications network based on the access request message; and
   transmitting an acknowledgment message for acknowledging the successful access, wherein the acknowledgement message is linked to the access request message such that the access request message can be identified based on the acknowledgement message.

12. The method of claim 11, wherein the acknowledgement message is linked to the message such that the message can be identified based on the acknowledgment message.

13. The method of claim 11, wherein the message includes a first preamble sequence out of a plurality of first preamble sequences, the acknowledgment message includes a second preamble sequence out of a plurality of second preamble sequences, and the second preamble sequence is linked to the first preamble sequence such that the first preamble sequence can be identified based on the second preamble sequence.

14. The method of claim 11, comprising: transmitting the message using a power setting resulting from a relatively aggressive power setting procedure.

15. A method for an apparatus of a communications network, the method comprising:
   receiving, from a mobile apparatus, a message for waking up the apparatus in order to achieve access to the communications network;
   determining whether the apparatus is in a standby mode in which a transmitter is deactivated;
   shifting the apparatus to a wake up mode, in which the transmitter is kept deactivated, for at most an apparatus-specific offset time in response to receipt of the message in case the apparatus is in the standby mode;
   detecting whether an acknowledgment message acknowledging that a successful access to the communications network has been achieved based on the message is received in the wake up mode of the apparatus;
   shifting the apparatus to an active mode in which the transmitter is activated and providing access to the communications network for the mobile apparatus based on the message using the transmitter in case no acknowledgment message has been received in the wake up mode when the apparatus-specific offset time elapses; and
   shifting the apparatus to the standby mode when the acknowledgement message is received in the wake up mode of the apparatus.

16. The method of claim 15, comprising: receiving the acknowledgement message from the mobile apparatus.

17. The method of claim 15, comprising:
   determining that the acknowledgment message acknowledges the successful access to the communications network based on the message, using preamble sequences of the message and the acknowledgment message.

18. The method of claim 15, comprising: receiving the acknowledgement message from an apparatus of the communications network.

19. The method of claim 18, wherein the acknowledgment message includes an identity of the mobile apparatus and/or a timestamp and a cell identity of a location from where the message is transmitted and/or a preamble sequence included in the message and a cell identity of the apparatus transmitting the acknowledgment message.

20. The method of claim 15, comprising:

sending the acknowledgment message acknowledging that the successful access to the communications network has been achieved based on the message to apparatuses of the communications network in case the apparatus has provided access to the communications network for the mobile apparatus based on the message.

21. The method of claim 15, wherein the apparatus-specific offset time fulfills the following expression:

$$t_{min} < \Delta t < t_{max},$$

where $\Delta t$ is the apparatus-specific offset time, $t_{min}$ is a minimum offset time and $t_{max}$ is a maximum offset time, wherein the method comprises receiving the minimum offset time and the maximum offset time from the communications network.

22. The method of claim 21, comprising:

deriving the apparatus-specific offset time from a cell identity of the apparatus and/or determining the apparatus-specific offset time based on a time of deactivation of the transmitter.

23. The method of claim 15, comprising:

when it is determined that the apparatus is in the active mode when the message is received, providing access to the communications network for the mobile apparatus based on the message and sending the acknowledgment message acknowledging that the successful access to the communications network has been achieved based on the message to apparatuses of the communications network in case the apparatus has provided access to the communications network for the mobile apparatus based on the message.

24. A non-transitory computer program product including a program for a processing device, comprising software code portions for performing the steps of claim 11 when the program is run on the processing device.

25. The computer program product according to claim 24, wherein the computer program product comprises a computer-readable medium on which the software code portions are stored.

26. The computer program product according to claim 24, wherein the program is directly loadable into an internal memory of the processing device.

* * * * *